United States Patent Office 3,196,136
Patented July 20, 1965

3,196,136
POLYMERIZATION OF OLEFINIC COMPOUNDS UTILIZING A CATALYST CONTAINING A TETRAKIS-(DIHYDROCARBONAMINO)SILANE
Stephen P. Boutsicaris, Akron, Ohio, assignor to The Firestone Tire & Rubber Company, Akron, Ohio, a corporation of Ohio
No Drawing. Filed July 13, 1961, Ser. No. 123,659
6 Claims. (Cl. 260—93.7)

This invention relates to a process for the polymerization of olefinic compounds to yield macromolecular polymers, and to certain novel catalysts for use in that process.

In recent years there have been developed catalytic processes for the polymerization of olefins which may be operated at moderate pressures and temperatures and which in many cases, depending upon the constitution of the catalysts used and the conditions of the polymerization reaction, yield high polymers of more or less predetermined chemical structure. Unfortunately, the catalysts used in these processes are constituted from, or involve as components, various organometallic compounds and/or various metallic oxides which are inherently costly and are available from only a few sources. Moreover certain of these components may leave perisistent toxic residues in the polymeric products. Further, although the stereospecific action of these processes have made possible the production of polymers of specialized structure, the possible variations in this field have by no means been exhausted. Particularly, it would be desirable to provide catalysts which are independent of the various special components referred to above, and which will yield polymers, particularly alpha-olefin polymers, of high stereoregularity and crystalline structure.

Accordingly, it is an object of this invention to provide a novel catalytic process for the polymerization of olefinic compounds, and in particular olefinic hydrocarbons, to form useful and valuable high polymers.

Another object is to provide such a process which is operable at moderate pressures and temperatures in inexpensive equipment.

A further object is to provide such a process in which the catalysts used are independent of the relatively expensive and restricted metal alkyls and specially treated oxides employed in prior art processes.

A still further object is to provide such a process which is capable of stereospecific effects not achieved in the prior art.

A still further object is to provide such a process for the polymerization af alpha-olefins to yield highly crystalline products.

Still another object is to provide novel catalytic compositions for use in the above and other processes.

Still another object is to provide such catalysts, the components of which will not leave toxic residues in the polymeric products produced by the use thereof.

SYNOPSIS OF THE INVENTION

The above and other objects are secured, in accordance with this invention, in a process of polymerizing an olefinic compound by contacting it with a catalyst comprising a mixture of (A) a nitride or phosphide of a metal of Groups I-A, II-A, II-B, III-A or IV-A of the Periodic Table [1] plus (B) a compound such as salt or an oxide of a heavy metal or of boron, silicon or arsenic, plus (C) a hydrocarbonaminated silicon or titanium compound in which one or more hydrocarbonamino groups are connected by bonds from the amino nitrogens to a silicon or titanium atom. The resultant polymers have molecular weights in the macromolecular range, and are of regular structure, the structure in any particular case being predetermined by the exact reagents used within the fields pointed out above, their ratio, and the conditions of reaction. In the preferred areas of the invention, the polymers obtained are crystalline and high-melting.

(A) THE METAL NITRIDES AND PHOSPHIDES

These may be any of the nitrides or phosphides of any of the metals of Groups I-A, II-A, II-B, III-A or IV-A as listed in the Periodic Table given in Lange's "Handbook of Chemistry," Fifth Edition, Handbook Publishers Inc., 1944, pages 54 and 55. In general, these are metals of high reducing potential and include for instance lithium, sodium, potassium, rubidium, cesium, beryllium, magnesium, calcium, strontium, zinc, cadmium, mercury, barium, aluminum, gallium, indium, thallium, germanium, tin, lead and the like. Any of the nitrides and phosphides of these metals may be used, such as lithium nitride ($Li_3N$), sodium nitride ($Na_3N$), potassium nitride ($K_3N$), calcium nitride ($Ca_3N_2$), magnesium nitride ($Mg_3N_2$), barium nitride ($Ba_3N_2$), aluminum nitride (AlN), gallium nitride (GaN), lithium phosphide ($Li_3P$), sodium phosphide ($Na_3P$), mixed metal phosphides such as lithium magnesium phosphide (LiMgP), condensed phosphides such as those of the formulae $Li_2P_5$, $Na_2P_5$, $K_2P_5$, and the like, magnesium sesquiphosphide ($Mg_3P_2$), calcium sesquiphosphide ($Ca_3P_2$), barium sesquiphosphide ($Ba_3P_2$), zinc phosphides ($ZnP_2$ and $Zn_3P_2$), boron phosphide (BP), aluminum phosphide (AlP), gallium phosphide (GaP), the tin phosphides ($SnP_3$ and $Sn_3P_4$), lead phosphide ($PbP_2$) and the like. It will be understood that mixtures of nitrides and phosphides such as above indicated as being suitable may also be employed. The various nitrides and phosphides are known compounds and in general are very simply prepared by direct reaction at moderately elevated temperatures of either elemental nitrogen or phosphorus with the free metal whose nitride or phosphide is desired. These compounds will be widely available, or indeed can be made in any establishment desiring to practice the invention.

(B) THE HEAVY METAL COMPOUNDS

The heavy metal salts and oxides forming the other components of the catalysts of this invention are those of the heavy metals (i.e., those metals embraced by the heavy black lines within the brackets entitled "HEAVY METALS" including the lanthanides or rare earth elements Nos. 57-71 in the Periodic Table on pages 54 and 55 of the Lange Handbook cited above) or of boron, silicon or arsenic. In general the compounds used will

[1] The version of the Periodic Table referred to is that given in Lange's "Handbook of Chemistry," fifth edition, Handbook Publishers Inc., 1944, pages 54 and 55; and by the term "heavy metals" it is intended to designate all of the elements embraced by the heavy black lines within the bracket entitled "HEAVY METALS," including the lanthanides or rare earth elements No. 57-71.

be oxides of these metals or salts thereof such as the chlorides, bromides, iodides, acetylacetonates, alkoxides or the like, it being understood that the salts need not be simple salts but may be the oxy-salts or salts containing different anions. Specific suitable heavy metal compounds for use in this invention include for instance titanium tetrachloride, zirconium tetrachloride, zirconium acetylacetonate, titanium tetrabutoxide, vanadium oxytrichloride, ferric chloride, ferrous chloride, antimony pentachloride, bismuth trichloride, titanium trichloride, stannic chloride, cobaltous chloride, antimonyl chloride, tungsten pentachloride, chromium chloride, nickel chloride and the like.

Particularly satisfactory results are secured with certain "activated" aluminum-titanium-chlorine-containing preparations produced by heating metallic aluminum with titanium tetrachloride at moderately elevated temperatures on the order of 90° C. in approximately the mol ratio of 3 mols of titanium tetrachloride to a gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given. The simple reaction product prepared as just described is not operative in the process of this invention, but must first be subjected to an "activation" process, after which it is known as an "activated" preparation and is suitable for use in this invention. The intermediate simple reaction product is subjected to intensive grinding as in a ball mill, edge runner, roll mill, disc mill, impact mill or the like. In general the extent of the grinding should be such that the power consumed in the process will amount to about 3–100 kilowatt hour per gram of material. The function of this grinding is not alone to reduce the particle size, but seems also to develop certain hyperactive, strained, crystal defect areas in the material, as the crystalline X-ray diffraction pattern changes progressively during the grinding. Thus materials of this composition which have been prepared with extremely fine particle size but not subjected to mechanical working and grinding have been found inferior for the purpose of this invention, and it therefore appears that the grinding effects some sort of fundamental chemical alteration in the reaction product. It will be understood that mixtures of heavy metal compounds above indicated as suitable may also be employed.

(C) THE HYDROCARBONAMINATED SILICON AND TITANIUM COMPOUNDS

These may be any compounds wherein one or more alkylamino groups are attached to a silicon or titanium atom by means of a covalent bond from the alkylamino nitrogen atom to the titanium atom, thus

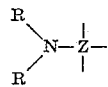

where

R, independently in each occurrence, represents a hydrocarbon group containing 1–20 carbon atoms, and Z is a silicon or titanium atom, the free valences of which may be occupied by other hydrocarbonamino groups or other innocuous groups such as oxo groups, oxygen bridges to other silicon atoms, alkyl groups and the like. In some cases, the atom Z may have one or more halogens attached thereto; for instance, the silanes and siloxanes discussed below are produced by the reaction of halo-silicon compounds, and in some cases the replacement of the halogen atoms with dihydrocarbonamino groups is not complete. It is preferred, however, to have all halogens replaced. One class of such compounds are the tetrakis-(dihydrocarbonamino) silanes and titaniums of the formula (V)

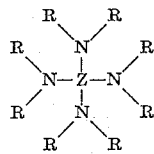

under the above notation. Likewise suitable are the compounds in which the silicon and titanium atoms are linked into chains with oxygen groups as in the siloxanes and corresponding titanium compounds:

(VI)

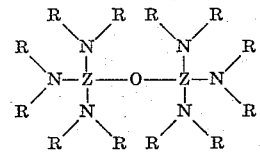

The central silicon or titanium atoms may also be connected to an oxo group thus

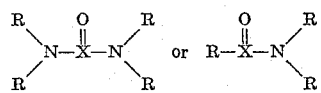

although frequently reactions calculated to yield these structures will result instead in condensed products. Compounds of the above various types are exemplified in tetrakis-(dimethylamino) silane, tetrakis-(diethylamino) silane, tetrakis-(di-n-butylamino) silane, tetrakis-(di-n-dodecylamino) silane, tetrakis-(di - n - octadecylamino) silane, tetrakis-(diphenylamino) silane, tetrakis-(dimethylamino) titanium, tetrakis-(diethylamino) titanium, hexakis-(dimethylamino) siloxane, the corresponding titanium compound $$[(CH_3)_2N]_3Ti—O—Ti[(CH_3)_2N]_3$$

hexakis-(diethylamino) siloxane, hexakis-(di - dodecylamino) siloxane, tri-(dimethylamino) ethyl silane, tri-(dimethylamino) ethyl titanium, alkylamino silicone polymers, the compounds of the formula $$(CH_3)_2N—SiO—N(CH_3)_2$$

phenyl tris-(dimethylamino) silane, methyl tris-(dimethylamino) silane, and the like.

THE MONOMERIC ETHYLENICALLY UNSATURATED COMPOUNDS

The polymerization method of the invention is applicable to the polymerization of any of the ethylenically unsaturated monomers commonly polymerized, and it is especially applicable to the polymerization of alpha-olefins, which are generally less readily polymerizable than the more polar ethylenically unsaturated monomers. The polymerization of propylene by the method of the invention is especially advantageous, since the polymerization product under preferred conditions possesses a high degree of crystallinity. Other monoolefins suitable for polymerization by the method of the invention include, for example, ethylene, butene-1, isobutylene, pentene-1 hexene-1, 3-ethylhexene-1, octene-1, 2-methylbutene-1, 3-methylbutene-1, 3,3-dimethylbutene-1, 2-methylpentene-1, 3-methylpentene-1, 4-methylpentene-1, 3-ethylpentene-1, 4,4-dimethylpentene-1, cyclopentene, cyclohexene, styrene, alphamethylstyrene, chlorostyrene, divinylbenzene, vinylnaphthalene, and the like. Also amenable to the process of the invention are polyolefinic compounds including, without limitation, butadiene-1,3, isoprene, 2,3-dimethylbutadiene-1,3, piperylene and the like. Likewise the invention can be used to polymerize vinyl and vinylidene monomers including, without limitation vinyl chloride, vinylidene chloride, chlorotrifluoroethylene, the lower alkyl acrylates, the lower alkyl methacrylates, the lower alkyl ethacrylates, vinyl acetate, vinyl propionate, acrylonitrile, methacrylonitrile, vinylpyridines, vinylcarbazole, and the like. The invention can be used to make copolymers or interpolymers of any of the monomers indicated above. Likewise the invention can be utilized to polymerize a prepolymer of a partially polymerized compound, with itself or with another ethylenically unsaturated compound.

THE PREPARATION OF THE CATALYSTS AND CONDUCT OF THE POLYMERIZATION REACTION

The catalysts of this invention are prepared by mixing and agitating the selected (A) nitride or phosphide, (B) heavy metal compound and (C) hydrocarbonaminated silicon or titanium compound together, preferably in a saturated aliphatic or aromatic liquid hydrocarbon vehicle such as petroleum ether, heptane, kerosene, mineral oil, diesel oil, benzene, toluene or the like. Usually the nitride or phosphide will be insoluble in the medium, and in many cases the heavy metal compound will also be insoluble. It may be advisable, in order to promote the reaction with the solids to subject the catalyst mass to grinding, as in a ball mill. Temperature of mixing may vary within wide limits, usually between −10° C. or lower, say down to −100° C. up to temperatures on the order of 150° C. Preferably the temperature will be in the range 20° C.–100° C. The cited temperature ranges also apply to the polymerization reaction proper. As to the relative proportions of the ingredients, usually a sufficient quantity of the nitride or phosphide will be used so as to supply at least about .7 gram-atom of nitrogen or phosphorus for each mol of the heavy metal compound. The upper limit is not critical, and is set mainly by economic considerations of cost of supplying unnecessary nitride or phosphide. It will usually be desirable to operate in the range of 1.0 to 3.0 gram-atoms of nitrogen or phosphorus (in the nitride or phosphide) per mol of heavy metal compound. With respect to the hydrocarbonaminated silicon and titanium compounds, these should be supplied in quantities sufficient to furnish at least 0.1 g.-atoms of amino nitrogen per mol of heavy metal compound. Again the upper limit is not critical, but ordinarily not over 10 g.-atoms of amino nitrogen will be supplied per mol of heavy metal compound. It will be understood that, instead of pure compounds, mixtures of compounds individually meeting the criteria for constituents (A), (B) and (C) may be used for each of these constituents. Additives such as hexamethyl phosphoramide may be incorporated in the catalysts, and will enhance the yield of crystalline polymers in the products, if this is desired. The catalyst may either be prepared in a separate vessel, or may be prepared in the vessel in which the polymerization proper is to take place, and in this latter case may optionally be prepared in the presence of the monomers to be polymerized. The polymerization is carried out by contacting the monomers with the catalyst, preferably in a saturated liquid hydrocarbon vehicle such as suggested above, preferably with sufficient agitation to insure contact of the catalyst and monomers and to avoid segregation of the product. The amount of vehicle employed should be preferably sufficient to avoid difficulty in agitation during the reaction, i.e. so that the concentration of the final polymer-product will be not over 50%, based on the total weight of polymer plus vehicle. The amount of catalyst should be such that it will reach economic exhaustion at about the same time that the vehicle contains all of the polymer it can carry without difficulty in agitation. Ordinarily it will be expected that each gram of catalyst will afford from 15 to 100 grams of polymer. The polymerization may be carried out batchwise, or in a continuous manner wherein the catalyst (or ingredients thereof), vehicle and monomer are continuously supplied to a reactor system and the resultant polymer solution or dispersion is continuously discharged from the reactor system. The polymeric products are purified by any suitable treatment, as by washing with alcohols, acids, ammonia and the like. The portions of the catalyst residues derived from the nitrides or phosphides, particularly when they involve metals of Groups I-A, magnesium and calcium and aluminum, are readily removable from the polymer, and in any event are innocuous.

With the foregoing general discussion in mind, there are given herewith detailed examples of the practice of this invention. All parts and percentages are given on the basis of weight, unless the contrary is specifically indicated.

*Example 1*

Heptane _____ 250 ml.
Propylene _____ 25 g.
Sodium phosphide (Na$_3$P) suspension (1 molar, suspended in mineral oil) _____ 2 ml. (.002 mol).
Aluminum-titanium-chlorine preparation [1] suspension (1 molar in Ti, sus- (1 molar, suspended in mineral oil) 2 ml. (.002 g.-atom of Ti).
Tetrakis-(dimethylamino) silane solution (1 molar, in hexane) _____ 2 ml. (.002 mol).

[1] Produced by reduction of TiCl$_4$ with metallic aluminum, followed by intensive grinding. "AA" manufactured by the Stauffer Chemical Company.

The heptane was charged into a 28-ounce beverage bottle, which was then flushed with nitrogen and sealed with a neoprene-lined crown cap provided with an aperture for the injection of reactants. The bottle was then inverted and placed in a cradle on a balance which was first brought to equilibrium and then overweighted with a 25-gram weight. Propylene was injected through a conduit and hydrodermic needle until the balance again was in equilibrium. At this point, the pressure in the bottle was about 40 p.s.i.g. The remainder of the ingredients were then hypodermically injected and the bottle attached to a polymerizer wheel revolving in a water bath at 50° C. for 72 hours. The pressure in the bottle was measured by means of a hypodermic gauge, and was found to be 13 p.s.i.g. after 16 hours and 2.0 p.s.i.g. after 68 hours on the wheel measured at 50° C. At the end of 72 hours, the bottle was removed, cooled to 25° C., vented and opened, and the polymer separated from the liquid vehicle by decantation. The solid product was then re-slurried in heptane, the slurry poured into methanol, and the mixture agitated for 15 minutes. The slurry mixture was then filtered, and the solid resinous product removed from the filter and dried in open air for 24 hours. This solid resinous product amounted to 21.3 grams and was evaluated at follows:

*Percent hot-heptane insoluble.*—A sample of the polymer was extracted for 48 hours in a Soxhlet extractor with boiling heptane. The undissolved residue amounted to 95.4% of the sample.

*Plasticity.*—A one-half-gram sample was pressed between aluminum foil sheets in a laboratory press at 190° C. with a total load of 2500 pounds on the ram. The area of the resultant plaque was 2650 mm.$^2$, which figure was taken as a measure of the plasticity of the polymer.

*Physical properties.*—Test specimens were injection molded at 180° C. and then annealed 2 hours at 125° C. The specimens showed a bending modulus of 128,000 p.s.i. and a Rockwell R hardness of 89.

The liquid decanted from the polymerization mixture and filtrate from the re-slurring operation were combined and diluted with ethanol and then heated to drive off the volatile material, leaving as a residue 5.6 grams of a rubbery material. This was believed to contain most of the mineral oil introduced with the catalyst ingredients, on the basis of which it is estimated that there were present 1.9 grams of non-crystalline polymer.

Example II

| | |
|---|---|
| Heptane | 250 ml. |
| Propylene | 25 g. |
| Sodium phosphide (Na₃P) suspension (.77 molar, in mineral oil) | 2.6 ml. (.002 mol). |
| Aluminum-titanium-chlorine preparation suspension (as in Example I, 1 molar in mineral oil) | 2.0 ml. (.002 mol). |
| Tetrakis-(dimethylamino) silane solution (1 molar, in heptane) | 1.0 or 2.0 ml. (.001–.002 mol, per Table I). |

A series of runs are made in accordance with the foregoing recipe, varying the proportions of tetrakis-(dimethylamino) silane and certain operations in the procedure as set forth hereinafter in Table I. In each case the procedure of Example I was followed, with the exception that in two of the runs (Nos. 3 and 4) the sodium phosphide suspension was withheld until the bottles had been on the wheel for 4 hours. Workup and determination of properties of the individual products was in accordance with Example I. Following are particulars of the several runs.

Example III

The procedure of Example II was repeated, except that in place of the molar solution of tetrakis-(dimethylamino) silane, there was used a 1 molar solution of hexakis-(dimethylamino) siloxane. Set forth hereinbelow in Table II are the results of the several runs. Also, since hexakis-(dimethylamino) siloxane is a specifically novel compound, set forth herewith is an account of the preparation thereof.

A solution of 290 g. (1.71 mol) of silicon tetrachloride in 190 grams of anhydrous diethyl ether was cooled to −70° C. by means of a Dry Ice-acetone bath. To the stirred solution was added dropwise 7.7 g. (0.428 mol) of distilled water. The mixture was then stirred at −65° to −70° C. for 4 hours, and thereafter allowed to warm up to 25° C. The ether and unreacted silicon tetrachloride were distilled off at room temperature and charged to the next batch, the residue being saved for final workup. A second run was made, using the distillate plus 39 g. of silicon tetrachloride, 25 g. of ether and 7.7 g. of water. After two more similar runs, the combined residues were distilled at 300 mm. and the portion boiling at 90–100° C., a crude hexachlorosiloxane was collected. Yield: 106 g.

The entire preparation of crude hexachlorosiloxane was dissolved in 200 ml. of anhydrous ether and added dropwise to a solution of 240 g. of dimethylamine in 1500 ml. of ether at −20° C. with stirring. After completion of the addition, the mixture was allowed to warm up gradually to 25° C., and stirred at this temperature for 18 hours. The dimethylamine hydrochloride was filtered off, and the filtrate refiltered into a 2-liter flask and the ether distilled off. The residue was then distilled under reduced pressure and the fraction boiling at 101–104° C./2 mm. was collected. Yield: 58 g. Analysis: N=21.5%.

TABLE II

| $(CH_3)N_6Si_2O$ used (millimols) | Yield (grams) | | Pressure (p.s.i.) After— | | Properties of Resinous Polymer | | | | Run No. |
|---|---|---|---|---|---|---|---|---|---|
| | Resin | Rubber | 17 Hrs. | 41 Hrs. | Percent Hot Heptane Insoluble | Bending Modulus (p.s.i.) | Rockwell R Hardness | Plasticity (mm.²) | |
| 1.0 | 21.0 | 5.7 | 18 | 4 | 94.9 | 116,600 | 84 | 3,700 | 1 |
| 2.0 | 19.6 | 4.2 | 27 | 1 | | 134,000 | 96 | 3,700 | 2 |
| 1.0 [1] | 23.2 | 3.5 | 57 | 3 | 95.7 | 112,000 | 80 | 3,700 | 3 |
| 2.0 [1] | 18.6 | 3.5 | 56 | 27 | | 128,800 | 93 | 4,250 | 4 |

[1] Sodium phosphide withheld in these runs until after the bottle had been on the wheel for 4 hours.

Example IV

| | |
|---|---|
| Heptane | 200 ml. |
| Propylene | 25 g. |
| Sodium phosphide suspension (1 molar, in heptane) | 1 ml. (.001 mol). |
| Aluminum-titanium-chlorine preparation ("AA," manufactured by Stauffer Chemical Company — 1 molar, based on titanium, suspension in mineral oil) | 2 ml. (.002 mol). |
| Phenyl tris-(dimethylamino) silane solution (1 molar, in heptane) | 0.5 ml. (.0005). |

TABLE I

| $[(CH_3)_2N]_4Si$ used (millimols) | Yield (grams) | | Pressure (p.s.i.g.) After— | | Properties of Resinous Polymer | | | | Run No. |
|---|---|---|---|---|---|---|---|---|---|
| | Resinous Polymer | Rubbery Product | 17 Hrs. | 41 Hrs. | Percent Hot Heptane Insoluble | Bending Modulus (p.s.i.) | Rockwell R Hardness | Plasticity (mm²) | |
| 1.0 | 20.2 | 4.8 | 20 | 5 | 95.4 | 125,000 | 88 | 3,320 | 1 |
| 2.0 | 20.3 | 2.6 | 22 | 8 | 97.0 | 107,300 | 82 | 3,340 | 2 |
| 1.0 [1] | 24.0 | 5.5 | 26 | 3 | 94.9 | 159,500 | 97 | 3,800 | 3 |
| 2.0 [1] | 22.5 | 4.5 | 38 | 12 | | 140,000 | 96 | 4,020 | 4 |

[1] Sodium phosphide withheld in these runs until after the bottle had been on the wheel for 4 hours.

The heptane, propylene, aluminum-titanium-chlorine suspension and phenyl tris-(dimethylamino) silane were charged into a polymerization bottle as described in the preceding examples, and the bottle revolved on a polymerization wheel in a bath at 50° C. for 4 hours. The sodium phosphide suspension was then injected, and the bottle replaced on the wheel and rotated for an additional 36 hours. The initial pressure was 56 p.s.i.g., and at the end of 17 hours, the pressure had dropped to 27 p.s.i.g. (pressure measured with bottle hot). At the end of the 36 hours the bottle was vented and the polymer recovered as described in Example I. The resultant product was a highly crystalline polypropylene.

From the foregoing general discussion and detailed experimental examples, it will be evident that the present invention provides a novel process for the polymerization of ethylenically unsaturated compounds, and particularly olefins, which is operable under mild conditions of pressure and temperature and which makes use of the widely available inexpensive and non-toxic metal nitrides and phosphides and the hydrocarbon aminated silicon and titanium compounds. The macromolecular products obtained are useful resins, rubbers and like polymeric materials.

What is claimed is:

1. Process which comprises polymerizing propylene by contacting the same with a catalyst consisting essentially of
   (A) Sodium phosphide
   (B) A titanium chloride, and
   (C) A tetrakis-(dihydrocarbonamino)silane in which the hydrocarbon groups attached to the nitrogen atoms contain 1–20 carbon atoms,
there being .7–3.0 moles of sodium phosphide (A) per mole of the titanium chloride (B) and the amount of the tetrakis-(dihydrocarbonamino)silane being sufficient to provide 0.1–10 gram-atoms of amino nitrogen per mole of titanium chloride (B).

2. Process according to claim 1, wherein the component (B) is the product of reduction of titanium tetrachloride by aluminum metal, said component having been subjected to intensive grinding.

3. Process according to claim 1, wherein the component (C) is tetrakis-(dimethylamino)silane.

4. Process according to claim 2, wherein the component (C) is tetrakis-(dimethylamino)silane.

5. A catalytic composition consisting essentially of
   (A) Sodium phosphide
   (B) A titanium chloride, and
   (C) A tetrakis-(dihydrocarbonamino)silane in which the hydrocarbon groups attached to the nitrogen atoms contain 1–20 carbon atoms
there being .7–3.0 moles of sodium phosphide (A) per mole of the titanium chloride (B) and the amount of the tetrakis-(dihydrocarbonamino)silane being sufficient to provide 0.1–10 gram-atoms of amino nitrogen per mole of titanium chloride (B).

6. A catalytic composition according to claim 5, wherein the component (B) is the product of reduction of titanium tetrachloride by aluminum metal, said component having been subjected to intensive grinding, and said component (C) is tetrakis (dimethylamino)silane.

References Cited by the Examiner

UNITED STATES PATENTS 3,048,574  8/62  Wiberg et al. _____ 260—93.7

FOREIGN PATENTS 538,782  12/55  Belgium.

JOSEPH L. SCHOFER, *Primary Examiner.*